(12) United States Patent
Nakano et al.

(10) Patent No.: US 6,264,840 B1
(45) Date of Patent: Jul. 24, 2001

(54) PROCESS FOR PRODUCING INSOLUBLE TANNIN AND METHOD FOR ADSORBING HEXAVALENT CHROMIUM BY USING THE TANNIN

(75) Inventors: Yoshio Nakano, Shizuoka; Yasuo Nakamura, Ibaraki-ken, both of (JP)

(73) Assignee: Mitsubishi Nuclear Fuel Co., Ltd., Ibaraki-ken (JP)

(*) Notice: Subject to any disclaimer, the term of this patent is extended or adjusted under 35 U.S.C. 154(b) by 0 days.

(21) Appl. No.: 09/384,181

(22) Filed: Aug. 27, 1999

(30) Foreign Application Priority Data

Feb. 26, 1999 (JP) .................................................. 11-050555

(51) Int. Cl.$^7$ ............................... B01D 15/00; C02F 1/28
(52) U.S. Cl. ..................... 210/688; 210/913; 502/401; 560/68
(58) Field of Search ................................ 210/688, 913; 502/401; 560/68

(56) References Cited

U.S. PATENT DOCUMENTS

| | | | |
|---|---|---|---|
| 5,158,711 | * 10/1992 | Shirato et al. | 210/681 |
| 5,274,169 | * 12/1993 | Shirato et al. | 560/68 |
| 5,296,629 | * 3/1994 | Shirato et al. | 560/68 |
| 5,300,677 | * 4/1994 | Shirato et al. | 560/68 |
| 5,320,664 | * 6/1994 | Shirato | 502/401 |
| 5,460,791 | * 10/1995 | Shirato et al. | 210/688 |
| 5,986,166 | * 11/1999 | Mukaida et al. | 604/368 |

\* cited by examiner

*Primary Examiner*—Ivars Cintins
(74) *Attorney, Agent, or Firm*—Reed Smith LLP

(57) ABSTRACT

The process of the present invention comprises the steps of (a) a step of dissolving a condensed tannin powder in an aqueous alkaline solution, (b) a step of admixing an aqueous aldehyde solution with the aqueous solution obtained in the step (a), (c) a step of adding the aqueous solution obtained by the above step (b) to a hydrophobic solvent containing a polyether type nonionic surfactant under heating and stirring to disperse the aqueous solution in the form of droplets in said hydrophobic solvent and (d) evaporating water components from the above-mentioned droplets to form a spherical and gelled insoluble tannins. Water content of the gel can be widely controlled as 5 to 90% as compared with the conventional adsorbent and the network structure and molecular space are changed depending on the size of the metal ion to be adsorbed so that a gelled insoluble tannin which can increase an adsorption capacity of metals can be obtained. Also, when it is used as an adsorbent, it is not necessary to be pulverized and a gelled insoluble tannin having a desired particle size and water content can be obtained.

4 Claims, 5 Drawing Sheets

Example 9 (50 magnifications)

(a)

Example 9 (1500 magnifications)

(b)

Comparative example 1 (50 magnifications)

(a)

Comparative example 1 (1500 magnifications)

(b)

PROCESS FOR PRODUCING INSOLUBLE TANNIN AND METHOD FOR ADSORBING HEXAVALENT CHROMIUM BY USING THE TANNIN

BACKGROUND OF THE INVENTION

1. Field of the Invention

This invention relates to a process for producing an insoluble tannin which can adsorb actinides such as uranium, thorium, transuranium elements, etc.; heavy metal elements such as cadmium, lead, chromium, mercury and iron, etc.; or metal elements such as cobalt, cesium, strontium, etc.

Also, it relates to a method for adsorbing hexavalent chromium by using the insoluble tannin.

2. Background Art

Nuclear fuel elements such as uranium, thorium, etc. are contained in the waste liquid effluent from nuclear fuel processing facilities. As a process for producing the adsorbing agent for adsorbing the nuclear fuel elements, the prior art discloses a process for producing an insoluble tannin by dissolving a condensed tannin powder in an alkaline solution, mixing the resulting solution with an aqueous aldehyde solution to form a gel composition, and aging the gel composition at room temperature or under heating to stabilize it (U.S. Pat. No. 5,320,664).

Also the prior art discloses a process for producing an insoluble hydrolysable tannin which comprises dissolving a hydrolysable tannin powder in an aqueous ammonia, mixing the resulting solution with an aqueous aldehyde solution to form a precipitate, heating the precipitate, soaking the heated precipitate in a mineral acid such as nitric acid, filtering the resulting mixture to leave a residue on a filter and drying it (U.S. Pat. No. 5,274,169).

The insoluble tannins obtained by the above-mentioned two methods have characteristics that they have a high ability of adsorbing metal elements and low flow resistivity when used in a packed column of the waste liquid effluent treating apparatus. When the water content of the insoluble tannin which is an adsorbent is controlled, the network structure of the gel changes so that its molecular space suitable for the size of the metal element ion to be adsorbed can be retained whereby there is a possibility that an adsorption capacity and adsorption rate of the metal element can be changed. Particularly, the insoluble tannin disclosed in U.S. Pat. No. 5,274,169 has a merit that it is resistant to crush when packed in a column and the adsorption rate of the metal element is more improved by contacting with a mineral acid to harden the tannin surface. Also, it has a merit of preventing occurrence of mold at the insoluble tannin by maintaining the gel to acidic conditions.

However, the ranges of water contents of the insoluble tannins controlled by the above-mentioned two methods are limited only to about 70% to about 85% in practical use.

Also, in the above-mentioned two methods, the insoluble tannins obtained by aging the gel composition at room temperature or under heating for stabilization are crushed into particle size by a mechanical means such as a mixer, etc. and sifted out a desired size so as to be packed in a column, etc. However, the particle size and shape of the insoluble tannin are not constant and when a fine particle insoluble tannin is desired, it must be finely pulverized specifically.

SUMMARY OF THE INVENTION

An object of the present invention is to provide a process for producing an insoluble tannin which can change an adsorption capacity and adsorption rate of a metal by changing a network structure of the gel and its molecular space wider as compared with the above-mentioned conventional adsorbents Another object of the present invention is to provide a process for producing an insoluble tannin having a desired particle size and a desired water content without pulverizing the tannin into particle size when it is used as an adsorbent.

The first invention relates to a process for producing an insoluble tannin which comprises (a) a step of dissolving a condensed tannin powder in an aqueous alkaline solution, (b) a step of admixing an aqueous aldehyde solution with the aqueous solution obtained in the step (a), (c) a step of adding the aqueous solution obtained by the above step (b) to a hydrophobic solvent containing a polyether type nonionic surfactant under heating and stirring to disperse the aqueous solution in the form of droplets in said hydrophobic solvent and (d) evaporating water components from the above-mentioned droplets to form spherical and gelled insoluble tannins.

Incidentally, in the present specification, the term "insoluble tannin" means a tannin which is insoluble in water or an acid or an alkali.

Through the steps (a) and (b), preliminary crosslinking of tannin is carried out to form a highly viscose solution. When the hydrophobic solvent is stirred in the step (c), the liquid surface of the solvent becomes conical shape to increase an area of gas-liquid interface. Here, the highly viscose solution dispersed in the hydrophobic solvent forms droplets, which flow along the interface. And the water components are evaporated from the droplets in the step (d) whereby the droplets become particles to form gelled insoluble tannins having various kinds of the network structure and the molecular space. The particle size and shape of the gelled insoluble tannin can be controlled depending on the flow conditions, etc. of the hydrophobic solvent such as the degree of its hydrophobicity, the viscosity, stirring rate, etc. Also, the water content of the gelled insoluble tannin can be controlled by changing the network structure and the molecular space thereof depending on the temperature of the hydrophobic solvent, the water evaporation time from the droplets, etc.

When the resulting insoluble tannin is contacted with a solution containing metal elements such as uranium, thorium, transuranium elements, cadmium, lead, chromium, mercury, iron, cobalt, cesium, strontium, etc., the gelled insoluble tannin adsorbs the metal elements with extremely efficiently. This is because the polyphenolic hydroxyl group possessed by the gelled tannin becomes a functional group and adsorbs a metal element by a hydrogen ion exchange reaction more effectively. Also, by making the gel, the degree of freedom of the molecular chain increases whereby the functional group of the molecular chain becomes a steric structure which is easily coordinated with a metal element so that the gelled insoluble tannin shows extremely excellent adsorption ability of the metal element.

The second invention relates to a process for adsorbing a hexavalent chromium to the insoluble tannin by adding the spherical and gelled insoluble tannin with a water content of 70 to 90% prepared by the process of the first invention to an aqueous solution containing the hexavalent chromium.

The gelled insoluble tannin the water content of which is adjusted to 70 to 90% can adsorb the hexavalent chromium with high efficiency.

DESCRIPTION OF THE PREFERRED EMBODIMENTS

The preparation process of the present invention comprises the preliminary crosslinking step of tannin which comprises the above-mentioned steps (a) and (b), and forming particles and building up the structure step of a highly viscose solution which comprises the above-mentioned steps (c) and (d).

Figure 1:
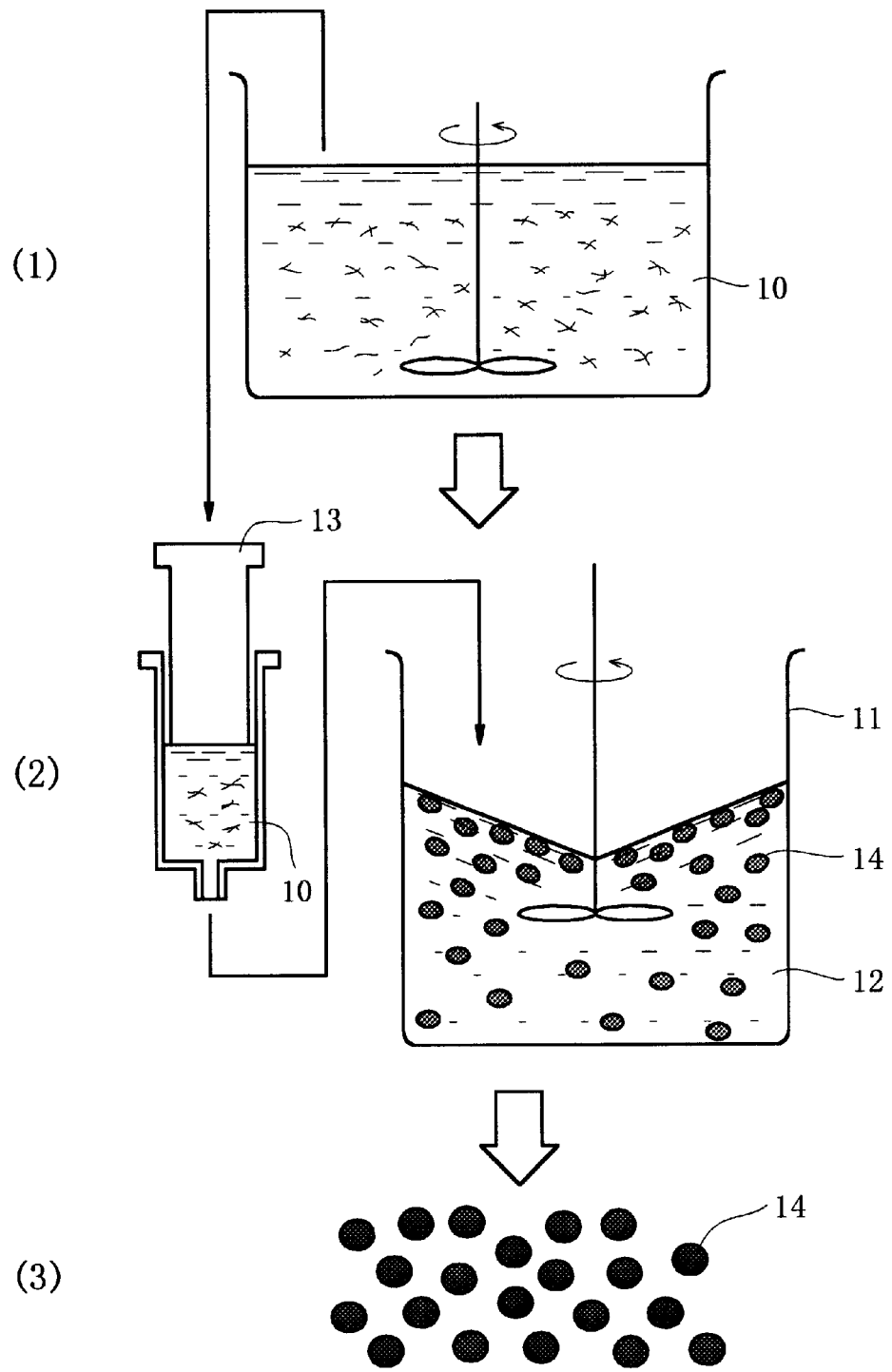
FIG. 1 is a flow sheet showing the preparation process of the present invention.

(1) Preliminary Crosslinking Step of Tannin As shown in FIG. 1 (1), in the preliminary crosslinking step of tannin, a condensed tannin powder is firstly dissolved in an aqueous alkaline solution at a pH of 8 to 10 and room temperature. If the pH is less than 8, the tannin powder will not easily dissolve, while if the pH exceeds 10, a partially crosslinked highly viscous solution will be unstable and will hardly become gel. The mixing ratio of the tannin powder is preferably within the range of 1 to 40 wt. % of the tannin powder based on the aqueous alkaline aqueous, more preferably 35 wt. %. If it is less than 1 wt. %, the tannin powder is hardly crosslinked, while if it exceeds 40 wt. %, the viscosity of the solution increases making it difficult to handle.

The tannin powder used in the present invention is a condensed tannin. Such condensed tannin is made from quebracho, wattle, mangrove, spruce, gambier, acacatechin, oak bark, and the like. The aqueous alkaline solution which dissolves the condensed tannin powder includes alkaline metal hydroxides such as sodium hydroxide, potassium hydroxide, lithium hydroxide, and the like, and an aqueous ammonia.

Then, an aqueous aldehyde solution is admixed with the aqueous solution in which the tannin powder is dissolved. As the aqueous aldehyde solution, for example, an aqueous solution of formaldehyde, acetaldehyde, glutaraldehyde, and the like may be used.

By initially dissolving the condensed tannin powder in the aqueous alkaline solution, and then, mixing with the aqueous aldehyde solution, the condensed tannin does not become precipitates but a highly viscous solution in which tannin is partially crosslinked. In the method shown in the conventional U.S. Pat. No. 5,320,664, the crosslinking reaction is delayed and the whole mother liquid becomes a hydrogel. Whereas, in the present invention, the degree of the above-mentioned crosslinking reaction can be widely controlled by the existence of the alkali metal ion or ammonium ion, the pH value and the temperature of the mother liquid, a partial crosslinking time, etc., whereby the crosslinking reaction proceeds depending on the reaction time with the aqueous aldehyde solution to obtain a solution having a viscosity corresponding to the respective conditions.

(2) Forming Particles and Building Up the Structure Step of Highly Viscose Solution Next, a hydrophobic solvent containing a polyether type nonionic surfactant is prepared. This hydrophobic solvent is not particularly limited so long as it is a solvent having no miscibility with the aqueous solution to which the above-mentioned aqueous aldehyde solution is added. As the polyether type nonionic surfactant preferably used in the present invention, there may be mentioned an alkylphenol type nonionic surfactant such as nonylphenol type (trade name: Nonipol) ($C_9H_{19}$), octylphenol type ($C_8H_{17}$), dodecylphenol type ($C_{12}H_{25}$), and the like. Also, as the preferable hydrophobic solvent in the present invention, there may be mentioned decalin, polybutene, hexane, toluene, and the like. The polyether type nonionic surfactant is added in an amount of 5 to 10 wt. % based on 100 wt. % of the hydrophobic solvent. If the added amount of the surfactant is less than 5 wt. %, stability of the droplets of the aqueous tannin solution is poor, while if it exceeds 10 wt. %, inconvenience occurs in properties of the gelied insoluble tannin as the adsorbent. Moreover, the hydrophobic solvent containing the polyether type nonionic surfactant is heated to room temperature to 100° C., preferably 50 to 90° C. If it is less than the room temperature, the droplets mentioned below are difficultly evaporated. Also, if it exceeds 100° C., boiling occurs whereby it makes difficult for the gel to build up the structure. While stirring the hydrophobic solvent heated to the above-mentioned temperature, the highly viscous solution preliminarily crosslinked by admixing with the aqueous aldehyde solution is added to the hydrophobic solvent. Stirring suspends the aqueous solution in the hydrophobic solvent and disperses it.

The particle size, shape and the network structure of the gelled insoluble tannin are controlled depending on the flow conditions of the hydrophobic solvent such as the degree of the hydrophobicity, viscosity, stirring rate, etc., of the hydrophobic solvent, temperature of the hydrophobic solvent, etc. More specifically, the higher the degree of the hydrophobicity of the hydrophobic solvent becomes, the smaller the particle size of the gelled insoluble tannin becomes. To the contrary, the particle size of the gelled insoluble tannin becomes larger when the degree of the hydrophobicity becomes lower, thereby having a hydrophilicity. Moreover, the higher the viscosity of the hydrophobic solvent becomes, the smaller the particle size of the gelled insoluble tannin becomes, whereas the lower the viscosity becomes, the larger the particle size of the gelled insoluble tannin becomes. Furthermore, the higher the stirring rate becomes, the smaller the particle size of the gel state insoluble tannin becomes, whereas the slower the stirring rate becomes, the larger the particle size of the gel state insoluble tannin becomes. According to the process of the present invention, the gelled insoluble tannin having a particle size ranging from about 0.01 mm to 5 mm can be prepared.

Also, the network structure and the molecular space of the gelled insoluble tannin are changed depending on the temperature of the hydrophobic solvent, water evaporation time from the droplets, etc. whereby a water content of the insoluble tannin can be controlled. More specifically, the water content of the gel state insoluble tannin becomes lower as the temperature becomes higher and the water evaporation time becomes longer, whereas the water content of the gel state insoluble tannin becomes higher as the temperature becomes lower and the water evaporation time becomes shorter. According to the process of the present invention, the gelled insoluble tannin having various kinds of the network structure and the molecular space, and a water content ranging from about 5 to 90% can be prepared.

(3) Post Treatment

The gelled insoluble tannin formed into particles in the hydrophobic solvent is taken out from the hydrophobic solvent, and then, washed with a water-soluble organic solvent such as acetone, etc. to remove a surfactant and hydrophobic solvent from the gelled insoluble tannin. Then, the gelled insoluble tannin is washed with a distilled water to remove the remaining water-soluble organic solvent, whereby the gelled insoluble tannin having various kinds of the network structure and the molecular space is obtained.

EXAMPLES

Next, the Examples of the present invention and the Comparative examples are explained based on the drawings.

Examples 1 to 10

23 g of wattle tannin powder corresponding to a condensed tannin were dissolved in 65 ml of an aqueous NaOH solution with a pH of 8.7 and 25° C. Since the pH of the resulting solution gradually decreases in proportion to the addition of the tannin powder, an aqueous NaOH solution was appropriately added to the resulting solution again so that the pH of the solution could be maintained to an alkaline side. Next, 6 ml of an aqueous solution containing formaldehyde 37 wt. % were added to the resulting solution. This solution was divided into three, and the three aqueous solutions were left alone for 5 minutes, 30 minutes and 60 minutes, respectively. As time passed, tannin is partially crosslinked to increase the viscosity of the solution, and the resulting solution 10 with a high viscosity can be obtained as shown in FIG. 1 (1).

On the other hand, in a reactor 11 with a volume of 20 liters, decalin (boiling point: 189° C.) which is a hydrophobic solvent 12 containing a polyether type nonionic surfactant (trade name: Nonipol) was charged. The above-mentioned three kinds of solutions 10 having different high viscosities were each collected in an injector 13, respectively, and these solutions 10 were added into four kinds of hydrophobic solvents 12 which had been each heated to 50° C., 60° C., 70° C. and 80° C., respectively, and stirred at the rate of 2000 rpm for the time as shown in Table 1 to suspend and disperse the solutions 10. According to this procedure, water contents were evaporated from the droplets of the solution, which were changed into spherical particles, to thereby form gelled insoluble tannin 14 comprising a specific network structure and molecular space.

Figure 2:
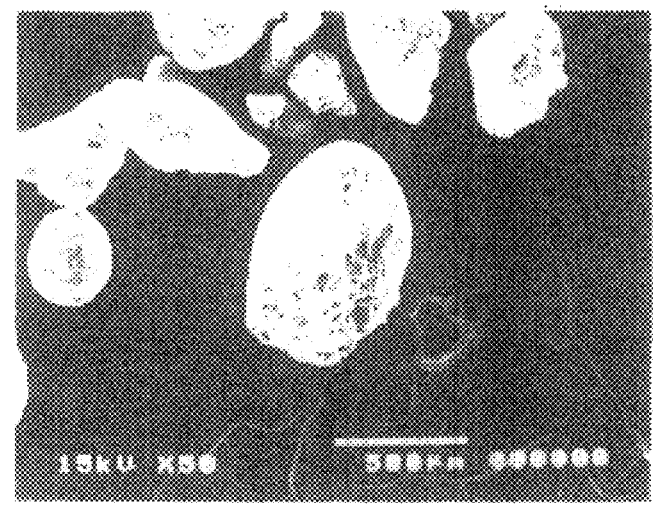
FIG. 2(a) is a microscopic photograph showing 50 magnifications of the gelled insoluble tannin in Example 9.
FIG. 2(b) is a microscopic photograph showing 1000 magnifications of the gelled insoluble tannin in Example 9.
Figure 2:
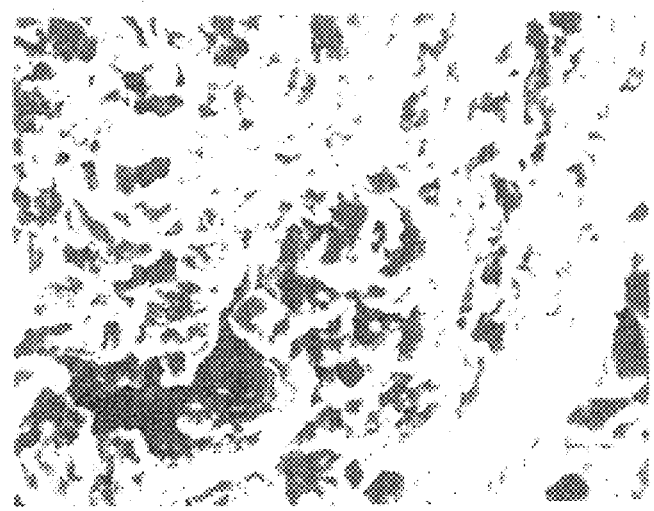

After the gelled and particle-shaped insoluble tannin 14 was taken out from the reactor 11, it was washed with acetone and then with distilled water. The particle shape and the average particle size after washing were examined by the transmission type electron microscope. The results are shown in FIGS. 2(a) and 2(b). Also, water contents of the particles immediately after washing with acetone and immediately after washing with distilled water were measured.

The results are shown in Table 1.

Comparative Example 1

23 g of wattle tannin powder corresponding to a condensed tannin were dissolved in 65 ml of an aqueous NaOH solution with a pH of 8.7 and 25° C.

A wattle tannin powder which is the same condensed tannin as in Example 1 was dissolved in an aqueous NaOH solution. In the same manner as in Example 1, after adding an aqueous formaldehyde solution to the resulting solution, the solution was heated over day and night at 80° C.

Figure 3:
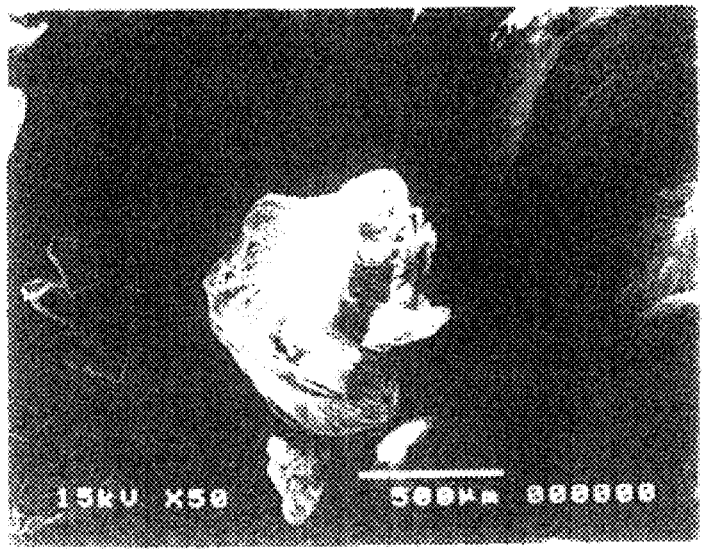
FIG. 3(a) is a microscopic photograph showing 50 magnifications of the gelled insoluble tannin in Comparative example 1.
FIG. 3(b) is a microscopic photograph showing 1000 magnifications of the gelled insoluble tannin in Comparative example 1.
Figure 3:
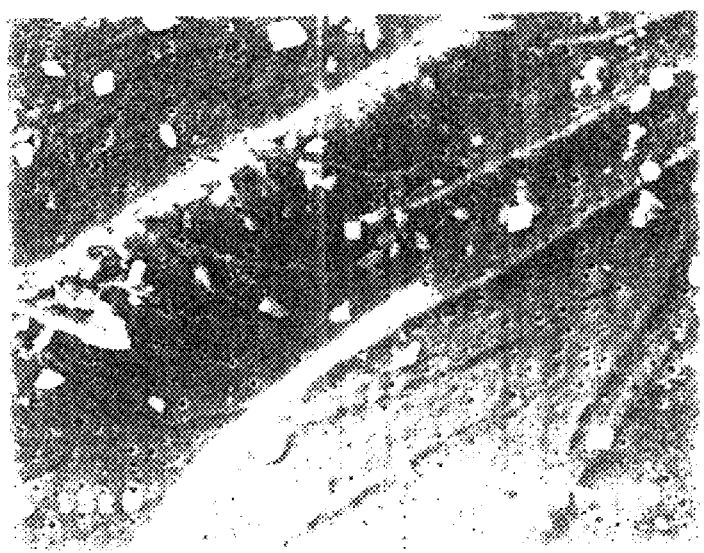

According to this procedure, gelation proceeded to obtain a stabilized gel composition. This gel composition was washed with distilled water, then crushed with a mixer and passing through a sieve to obtain a gelled insoluble tannin with a uniform particle size. The particle shape and the average particle size of the gelled insoluble tannin were examined by the transmission type electron microscope. The results are shown in FIGS. 3(a) and 3(b). Also, a water content was measured immediately after washing with distilled water. The result is shown in Table 1.

Comparative Example 2

The gelled insoluble tannin obtained in Comparative example 1 with a uniform particle size by passing through the sieve was placed in 0.1 N dilute nitric acid, and the mixture was stirred for a 30 minutes. This nitric acid solution was filtered through a filter paper (Toyo Roshi, No. 2), and immediately after washing the filtered gelled insoluble tannin with a distilled water, the water content of the particles was measured. The result is shown in Table 1.

TABLE 1

| | Preliminary crosslinking Reaction time (min) | Hydrophobic solvent Temperature (min) | Reaction time (min) | Water content (%) of gelled insoluble tannin | |
|---|---|---|---|---|---|
| | | | | Acetone Washing | Distilled water washing |
| Example 1 | 30 | 50 | 60 | 66.1 | 76.4 |
| | | | 90 | 42.8 | 77.6 |
| Example 2 | 5 | 60 | 60 | 42.0 (49.4) | 71.1 (78.9) |
| | | | 90 | 26.4 | 67.7 |
| Example 3 | 30 | | 60 | 34.2 | 70.6 |
| | | | 90 | 15.5 (29.5) | 57.8 (78.6) |
| Example 4 | 60 | | 60 | 33.0 | 69.2 |
| | | | 90 | 24.0 | 61.9 |
| Example 5 | 5 | 70 | 60 | 24.7 | 60.1 |
| Example 6 | 30 | | | 21.5 | 49.5 |
| Example 7 | 60 | | | 22.5 | 50.3 |
| Example 8 | 5 | 80 | 60 | 24.5 (25.4) | 59.1 (58.6) |
| Example 9 | 30 | | | 10.4 (9.5) | 53.0 (49.7) |
| Example 10 | 60 | | 90 | 19.2 | 54.4 |
| | | | | 1.79 | 40.1 |
| Comparative example 1 | — | — | — | | 72 |
| Comparative example 2 | — | — | — | | 72 |

(At the column of the water content, the numerical value in the parentheses is the value measured when the preliminary crosslinking temperature was changed to the range of 25 to 40° C.)

As shown in FIGS. 2(a) and 2(b), the gelled insoluble tannin of Example 9 is substantially spherical and fine pores with several ten μm were observed on the surface in the network structure thereof. On the other hand, the gelled insoluble tannin obtained in Comparative example 1 is as shown in FIGS. 3(a) and 3(b), a mass-crushed product having significant unevenness on the surfaces thereof, and no large fine pore was observed on the surfaces thereof.

The water contents of the particles of Examples 1 to 10 immediately after washing with acetone are 66.1 to 1.79% and when these particles are further washed with distilled water, the water contents of the particles are increased to 77.6 to 40.1% and swelled. To the contrary, the water contents of the particles of Comparative examples 1 and 2 immediately after washing with distilled water were in the range of about 66 to 77% and the average value was 72%.

From these facts, it was confirmed that, in Examples, gelled insoluble tannins with low water contents which had never been obtained in Comparative examples could be obtained. Also, in Examples, it was found that the particles were contracted in acetone while they were swelled when they were contacted with distilled water.

<Adsorption Test of Hexavalent Chromium>

(a) By raising the temperature of decalin which is a hydrophobic solvent to 80° C. (Examples 8 to 10), gelled insoluble tannins with the water contents of about 40 to 59% were prepared. Also, in the same manner, by raising to 70° C. (Examples 5 to 7), gel state insoluble tannins with the water contents of about 49 to 60% were prepared. Moreover, by raising to 60° C. (Examples 2 to 4), gel state insoluble tannins with the water contents of about 58 to 71% were prepared. For comparison, gelled insoluble tannins with the water contents of about 68 to 86% of Comparative examples 1 and 2 were prepared. From the above, it could be understood that the higher the temperature of decalin becomes, the lower the water content becomes, and the lower the temperature of the decalin becomes, the higher the water content becomes.

Each 0.2 g of the gelled insoluble tannins of Examples 1 to 10 and Comparative examples 1 and 2 was added to 40 ml of a solution with a hexavalent chromium ($CrO_3$) concentration of 1000 ppm, respectively. After reaching the equilibrium, the gelled insoluble tannins were taken out from the solution, and the concentrations of chromium in the remaining solutions were measured to obtain adsorption capacities of the chromium adsorbed to the respective insoluble tannins. The results are shown in FIG. 4.

Figure 4:
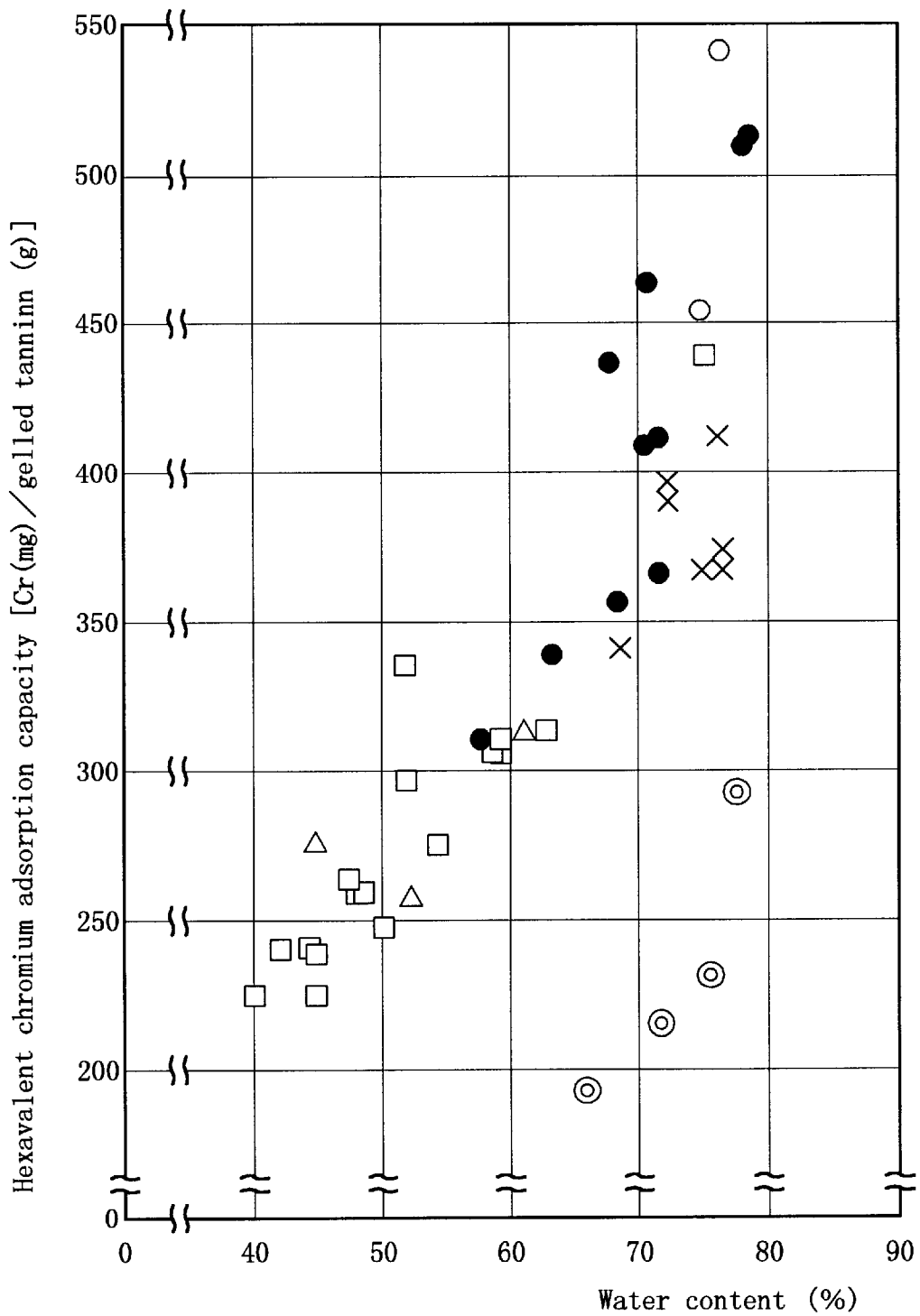
FIG. 4 is a drawing showing hexavalent chromium adsorption capacities of the gelled insoluble tannins depending on the water contents of Examples and Comparative examples.

As can be seen from FIG. 4, it can be understood that the higher the water content becomes, the higher an adsorption capacity of hexavalent chromium becomes. In particular, whereas in the insoluble tannin with the water content of 72% treated by nitric acid of Comparative example 2, 192 to 287 mg of hexavalent chromium was adsorbed per gram of the gelled insoluble tannin, in the insoluble tannin with the water content of 77.6% of Example 1, 540 mg of hexavalent chromium which corresponds to about 1.9 to 2.8-fold of Comparative example 2 could be adsorbed. Also, even in the same high level water contents, mechanical strengths of the gelled insoluble tannins of Examples 1 to 10 were higher than that of Comparative example 1.

(b) By keeping the temperature of decalin which is a hydrophobic solvent 60° C., a gelled insoluble tannin with the water content of about 70% were prepared (Example 11). Also, in the same manner, by keeping it 50° C., a gelled insoluble tannin with the water content of about 83% were prepared (Example 12).

Each 0.2 g of the gelled insoluble tannins of Examples 11 and 12 was added to 80 ml of a solution with a hexavalent chromium ($CrO_3$) concentration of 1000 ppm, respectively, and then, the adsorption rates of the hexavalent chromium to the insoluble tannins were examined. The results are shown in FIG. 5.

Figure 5:
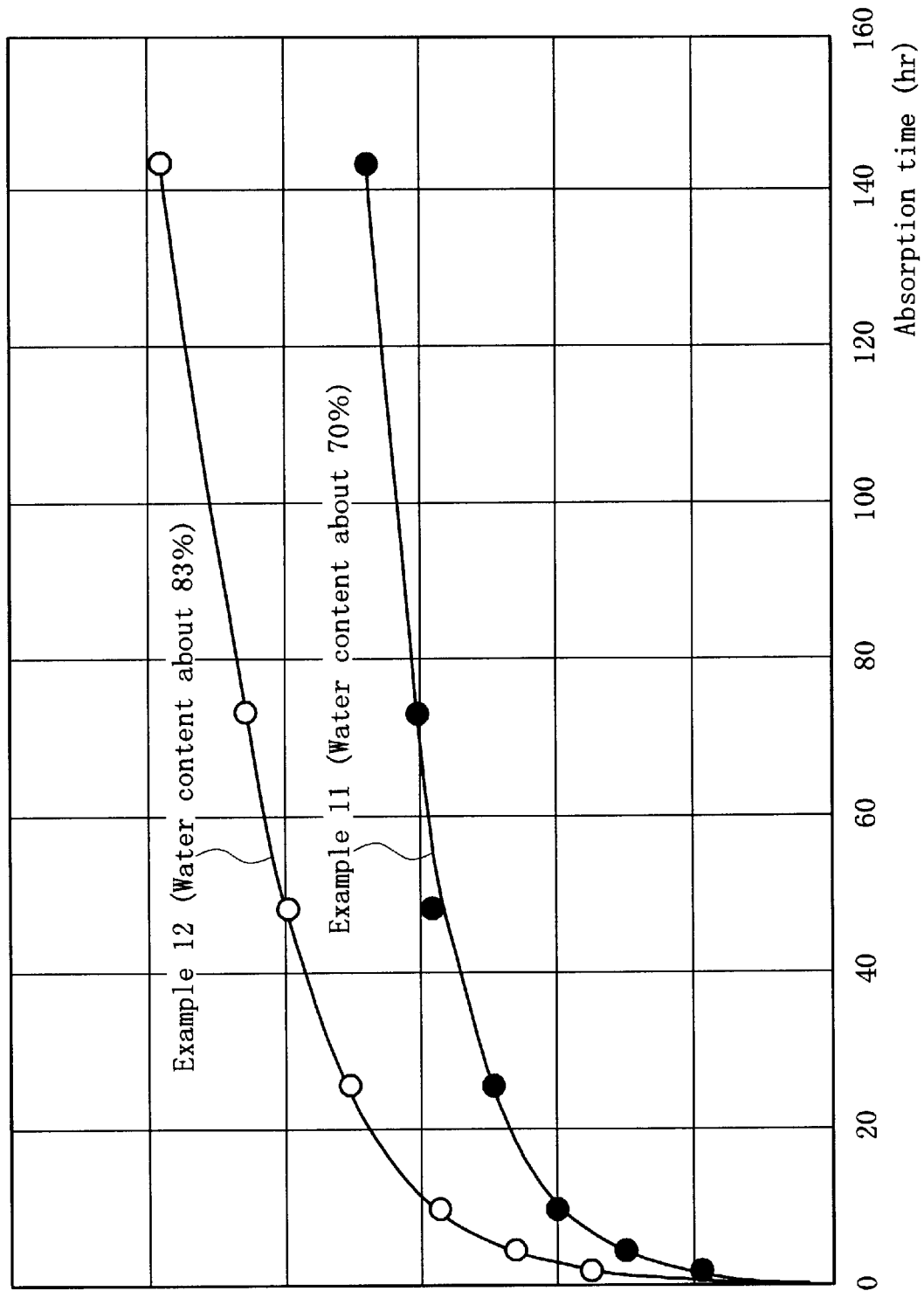
FIG. 5 is a drawing showing hexavalent chromium adsorption rates of the gelled insoluble tannins depending on the water contents of Example 11 and Example 12.

As can be seen from FIG. 5, in both of Examples 11 and 12, adsorption capacities are saturated at about 60 hours after the addition, but the insoluble tannin of Example 12 the water content of which is about 83% has higher adsorption rate than that of the insoluble tannin of Example 11 the water content of which is about 70% and a higher absorption capacity can be obtained within a relatively short time.

As described above, according to the producing process of the present invention, the water content of the gelled insoluble tannin can be controlled and the network structure and the molecular space of the gel can be changed. According to this, suitable network structure and molecular space depending on the size of the metal element ion to be adsorbed can be ensured. Thus, an insoluble tannin having an extremely high adsorption capacity of a metal can be obtained as compared with the conventional adsorbents, and it is not necessary to pulverize the material when it is used as an adsorbent whereby excellent effects can be accomplished that a desired particle size and shape can be obtained.

What is claimed is:

1. A process for producing an insoluble tannin which comprises the steps of (a) dissolving a condensed tannin powder in an aqueous alkaline solution, (b) admixing an aqueous aldehyde solution with the aqueous solution obtained in the step (a), (c) adding the aqueous solution obtained by the above step (b) to a hydrolic solvent containing a polyther nonionic surfacant under heating and stirring to disperse the aqueous solution in the form of droplets in said hydrophobic solvent and (d) evaporaring water components from the above-mentioned droplets to form spherical and gelled insoluble tannins.

2. The process of claim 1 wherein the particle size of the insoluble tannin is controlled to be value within the range of 0.01 mm to 5 mm by adjusting at least one of the following flow conditions of the hydrophobic solvent: hydrophobicity of the hydrophobic solvent, viscosity of the hydrophobic solvent and stirring rate of the hydrophobic solvent.

3. The process of claim 1 wherein the water content of the insoluble tannin is controlled to be a value within the range of 5 to 90% adjusting at least one of temperature of the hydrophobic solvent and evaporation time of water from droplets whereby changing the network structure and the molecular space of the insoluble tannin.

4. A method for adsorbing hexavalent chromium which comprises adding spherical gelled insoluble tannin with a water content of 70 to 90% prepared by the process according to claim 1 to an aqueous solution containing hexavalent chromium to adsorb said hexavalent chromium to said insoluble tannin.

* * * * *